Dec. 31, 1940. J. LAUTERBACH 2,227,265
HYDRAULIC MOLDING PRESS
Filed Oct. 11, 1938 4 Sheets-Sheet 1

Inventor
John Lauterbach

Dec. 31, 1940.  J. LAUTERBACH  2,227,265
HYDRAULIC MOLDING PRESS
Filed Oct. 11, 1938  4 Sheets-Sheet 2

Inventor
John Lauterbach
Fred B. Dieberger
Atty

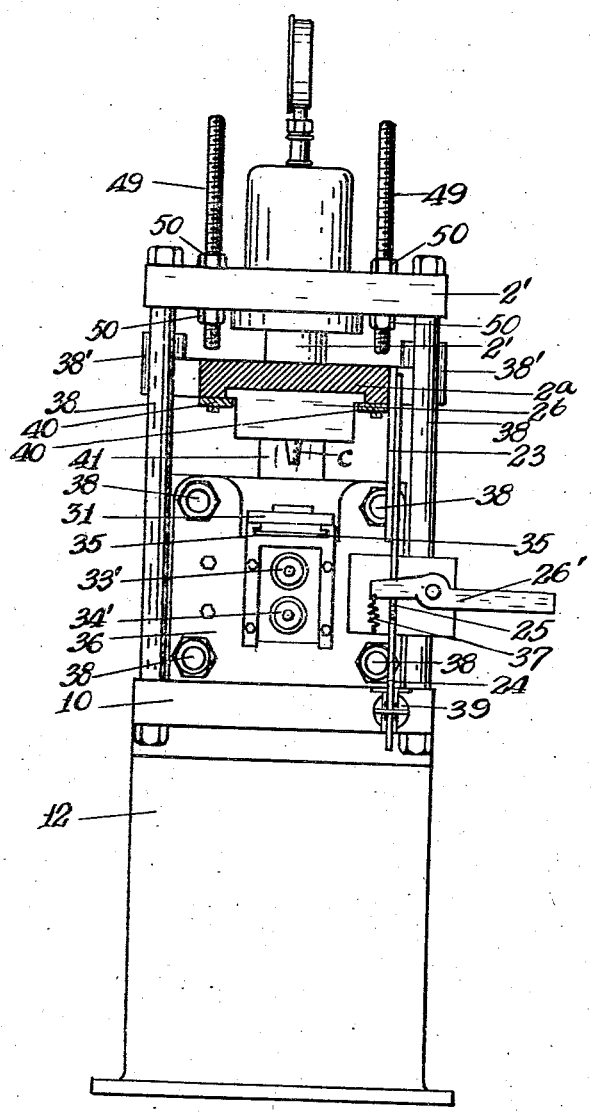

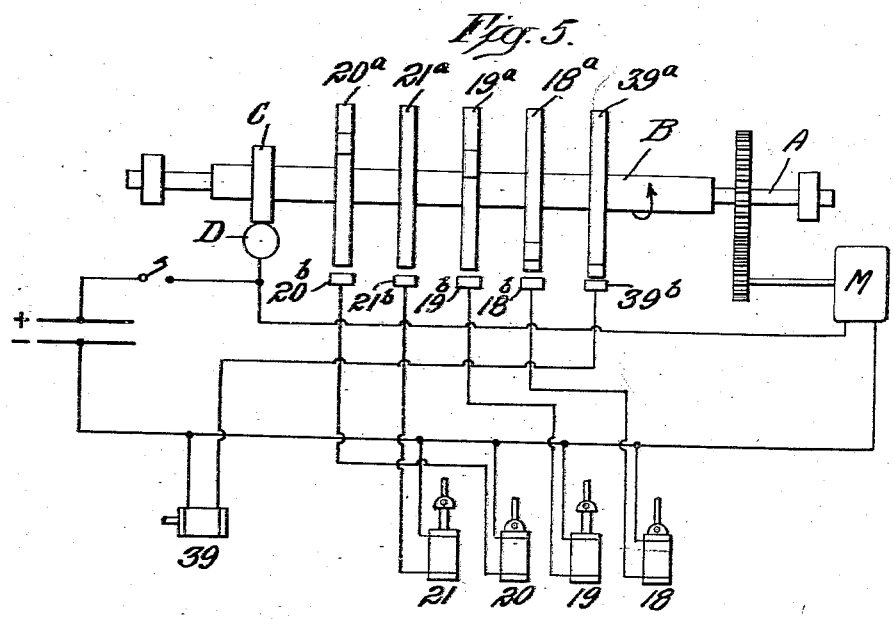
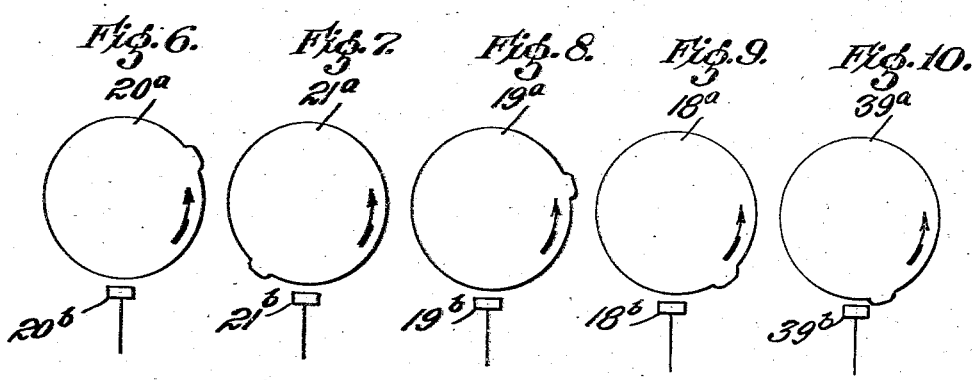

Patented Dec. 31, 1940

2,227,265

UNITED STATES PATENT OFFICE 2,227,265

HYDRAULIC MOLDING PRESS

John Lauterbach, Philadelphia, Pa., assignor, by direct and mesne assignments, to The Watson-Stillman Co., Roselle, N. J., a corporation of New Jersey Application October 11, 1938, Serial No. 234,365

19 Claims. (Cl. 18—16)

This invention relates to hydraulic molding presses used in the plastic arts, particularly in the manufacture of articles from synthetic resins, and specifically to presses adapted for use with three part molds.

The object of this invention is to provide a hydraulic molding press having a single horizontal mold supporting platen movable in its own plane, and vertically movable with respect to the horizontal plane of the press bed; and two vertical mold supporting platens, one of said platens being fixed and immovable the other platen being movable solely in a horizontal plane.

Another object of this invention is to provide co-operative mechanical means between the horizontal platen and the movable vertical platen, whereby automatic ejection of the molded parts may be readily effected; the respective movable platens being actuated by hydraulic rams to bring the respective mold parts into proper angular relation.

Further objects and advantages will be apparent from the following description of the invention as is hereinafter fully disclosed.

In the accompanying drawings:

Fig. 4 is an end elevation showing the feed control mechanism.

Fig. 5 is a diagrammatic view of electrical timing mechanism for controlling the operation of the press.

Figs. 6, 7, 8, 9 and 10 are diagrammatic views of the contact cams of the timing mechanism, showing the cams in their relative positions with respect to the fixed contacts.

Figure 1:
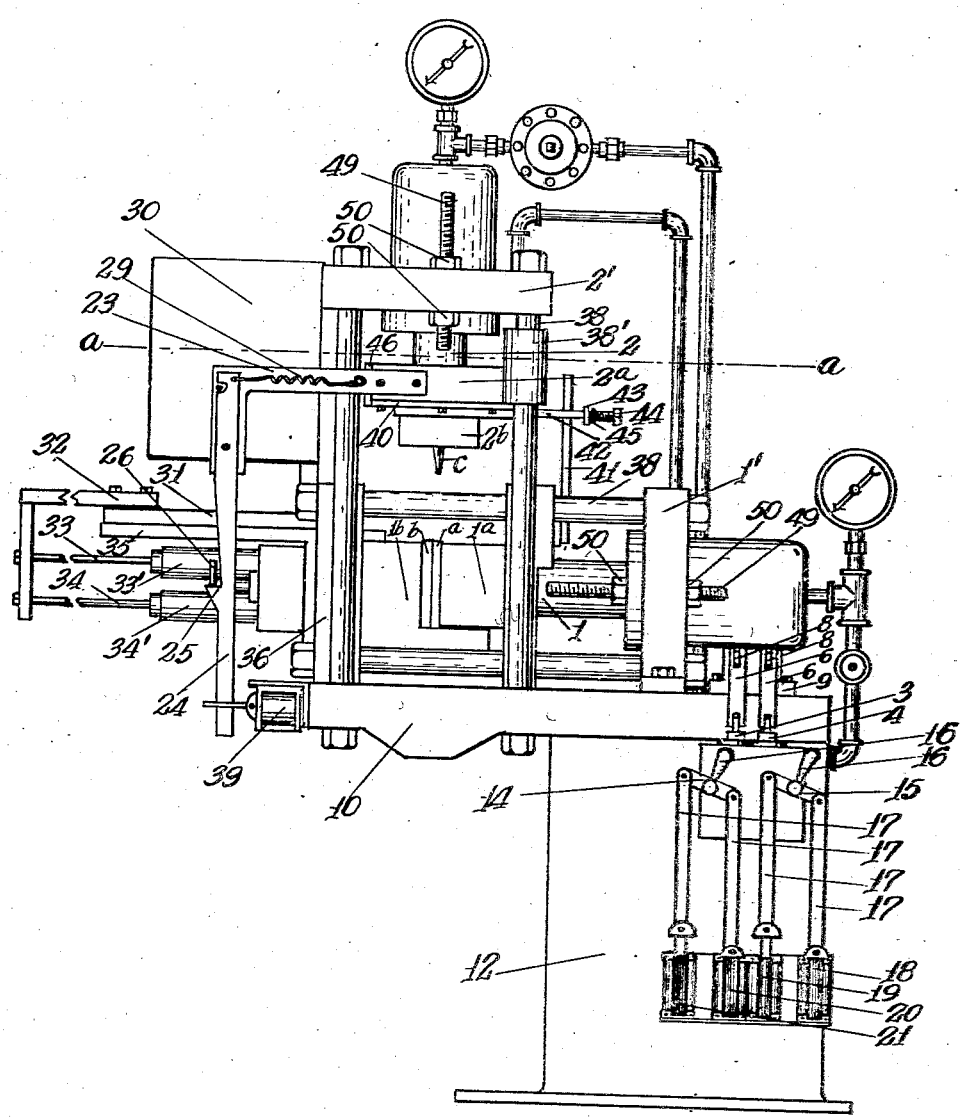
Figure 1 is a front elevation of the press embodying the invention.

Various well known parts of a hydraulic molding press have been omitted from the drawings to permit an accurate disclosure of the novel features herein described.

The reference characters indicate the same parts in the several drawings.

In the practice of the invention, as shown in Figure 1, the conventional steel tension bars or rods 38 are provided to maintain spaced relation between the bed portions 10 and 36, and the hydraulic cylinder mountings, 2' and 1' of the respective parts of the press. Two tension rods of each group serve as guides for the movable platens 2—a and 1—a, each of the said platens being provided with suitable integral sleeve members 38' slidably engaging said tension rods.

The hydraulic fluid conducting means is not shown in detail or described, as these, and the various means for heating mounted molds are well known in the art, any of which may be employed.

The automatic electric timer shown diagrammatically in Figs. 5 and 6 is of the type shown in Patent No. 1,655,815, dated January 10, 1928. It comprises a series of contact cams mounted on a single shaft, the individual cams being set with relation to each other to make electrical contacts at predetermined intervals during the cycle of operation. Each cam in the group energizes a solenoid controlling one phase of the press operation.

The hydraulic valves which control the reciprocating movement of the hydraulic rams 1 and 2, are directly operated by two compressed air cylinders 3 and 4. Each air cylinder piston rod is operatively connected to its respective hydraulic valve stem 5, (see Fig. 3) by means of connecting links 6 and 7, pivoted in a lever 8, said lever being mounted in a lever guide bearing 9 secured to the press bed 10. The hydraulic valve chest 11 is mounted on the inside of the base member 12 directly below the guide bearing 9. The compressed air cylinders 3 and 4 are mounted directly opposite the valve chest 11 on the outside of the base member 12. Figure 1 shows the compressed air cylinder valve control levers 14 and 15, the upwardly extending lugs 16 being provided as handles for the manual operation of the valves which control the operation of the hydraulic rams 1 and 2 when setting up the press for molding.

Figure 3:
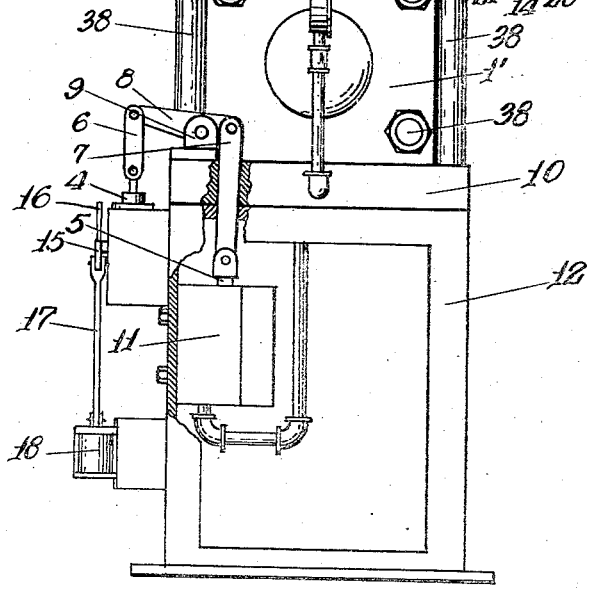
Fig. 3 is an end elevation taken below the line a—a in Figure 1, showing the hydraulic cylinder control mechanism.

Each end of the air valve control levers 14 and 15 is connected to a solenoid by means of the links 17. Fig. 3 may be followed to note the sequence of operation of each of the solenoids, the intermediate hydraulic ram controlling means being identical, as follows; solenoid 18 having been energized by the timer, pulls down the link 17 thereby opening an air port to cylinder 4 impelling the piston therein upward, and through the link 6, and the lever 8, forces downward the link 7 connected to the hydraulic valve stem 5, thereby causing the hydraulic ram 1 to move outward to close the mold sections b and a. On reversing the direction of the air valve lever 15 through the timer energizing the solenoid 19 (see also Figure 1), the ram movement is reversed and the mold is opened. The solenoids 18 and 19 control the horizontal ram 1, and the solenoids 20 and 21 control the vertical hydraulic ram 2.

Figure 1, shows the press in a closed position with respect to the horizontal hydraulic ram 1 upon which is mounted the vertical mold supporting platen 1—a opposite to the fixed or immovable platen 1—b. The space between the platens 1—a and 1—b is occupied by a split mold, the respective sections thereof, a and b, being secured to platens 1—a and 1—b. The position of the vertical hydraulic ram platen 2—a is shown at a point prior to the completion of its upward stroke.

The platen 2$^a$ has mounted thereon an angular link supporting member 23, and a pivoted link 24, said link having a catch 25 thereon adapted to engage a compressed air valve control lever 26, the link 24 being held in operative engagement with the lever 26 by means of a spring 29.

The valve lever 26 is held in a neutral or closed position by a spring 37, as shown in Fig. 4, and in which position a feeder slide 31 retains a feeder under the opening in the bottom of a hopper 30. The jacketed hopper 30, adapted to preheat molding powders, is mounted upon the vertical hydraulic cylinder mounting 2 directly above the feeder slide 31, upon which slide the feeder (not shown) is mounted at its outward end, said feeder being adapted to forward molding powders contained in the hopper 30 to the mold openings. The air valve control lever 26 is extended forwardly from its pivot to provide an arm 26' for manual manipulation of the air valve.

The feeder slide 31 has mounted thereon an angular member 32 to which the piston rods 33 and 34 are rigidly secured. The piston rods 33 and 34 reciprocate in compressed air cylinders 33' and 34' and actuate the feeder slide 31, said slide traveling in suitable gibbed ways 35 which are mounted on the outward face of the bed portion 36.

A solenoid 39, mounted on the bed portion 10, has mounted in the plunger thereof a flat steel plate having a rectangular slot therein, said slot being provided to receive the free end of the lever 24 for the purpose of retracting said lever 24 to disengage the catch 25 from the valve lever 26, and thereby actuate a compressed air piston in the cylinder 34' to return the slide 31 to a neutral or closed position under the hopper 30.

Figure 2:
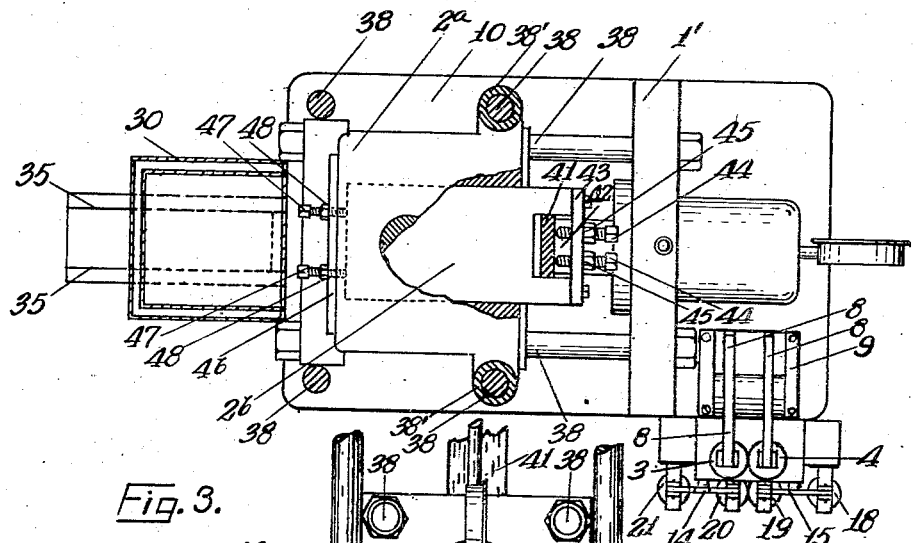
Fig. 2 is a plan view, partly in section, taken on line a—a in Figure 1, showing the movable horizontal platen.

The horizontal platen 2—a which is actuated by the hydraulic ram 2, is provided with gibbed ways 40, in which a mold-closing and article-stripping sub platen 2—b is reciprocably mounted. The reciprocating article-stripping movement of the sub platen 2—b is controlled by an upright steel bar 41 rigidly attached to the vertical platen 1—a, the upper end of said bar 41 being enclosed within a rectangular recess 42 in the rear end of the sub-platen 2b, the said bar and recess forming a lost-motion connection between the platen 1a and the sub-platen 2b. A steel plate 43, which provides a closure for the rectangular recess 42, has mounted therein two set screws 44 for the purpose of limiting the travel of the bar 41 to a predetermined distance before said bar 41 moves the sub-platen 2b rearward in the article-stripping direction. The set screws are secured in the desired position by lock nuts 45. The travel of sub-platen 2b is limited at its other end by a steel plate 46 secured to the platen 2a, said plate forming a closure for the gibbed ways in the platen 2a. Set screws 47 are mounted in said plate to limit the forward movement of sub-platen 2b, these screws being locked in position by lock nuts 48. (See Fig. 2.) The article-stripping sub-platen carries a depending core piece or section c which enters the mold and serves as a plunger to force the molding material into all parts of the mold and as means to connect the molded article to the stripping platen, so that when the mold sections are separated the core piece acts as an article-stripping projection. When the forward edge of the sub-platen engages the screws 47 the core piece c is centered directly over the mold a—b. The lost motion connection between the platen 1$^a$ and the horizontal sub-platen 2$^b$ formed by the bar 41, the recess 42 and the set screws 44 provides a means for securing a variable dwell or pause between the reciprocal movement of the platen 1$^a$ and the sub-platen 2$^b$. By adjusting the screws 44 the dwell or pause may be varied to suit the operating conditions of the press.

Stud bolts 49 with lock nuts 50 are placed in the hydraulic cylinder mountings 1' and 2' to limit the retracted travel of the platens 1a and 2a when actuated by their respective controlling rams.

The electrical timing means diagrammatically illustrated in Figs. 5 and 6 comprises a shaft A driven by motor M and carrying a sleeve B, said sleeve being electrically insulated from the shaft A. On the sleeve B is mounted a contact disc C which receives main-line current through contact D. Sleeve B carries a series of contact cams 20$^a$, 21$^a$, 19$^a$, 18$^a$, and 39$^a$ to close the circuits through the solenoids 21, 20, 19, 18 and 39 in the properly timed relation.

Mode of operating the press by the automatically controlled electrical timer:

The operation of the press may be readily understood by reference to Fig. 1 of the drawings, wherein the press is shown with the mold a—b closed and the platen 2a and sub-platen 2b being carried upwardly by the ram 2 which is being moved to its retracted position. This upward movement of the platen 2a carries upward the link 24, and the catch 25 on said link engages the air valve control lever 26 and moves it upwardly. The upward movement of lever 26 opens an air port to admit air to cylinder 33' to actuate the piston 33 and thereby move the slide 31 inwardly to place the feeder on said slide directly over the mold opening. The feeder, having been previously charged from the hopper 30 with molding material, delivers the material into the mold, filling it for the molding operation. The timer then energizes solenoid 39 which retracts link 24 thereby disengaging the catch 25 from the air valve lever 26. The spring 37 connected to the air valve lever 26 returns the lever to its lower position thereby opening an air port to cylinder 34' to actuate piston 34 to return the slide 31 to its normal position under hopper 30, as shown in Fig. 1.

The mold having been filled, the timer energizes solenoid 21 which controls the downward movement of the ram 2 and the horizontal platen 2a and the mold-closing sub-platen 2b. The downward movement of ram 2 causes the sub-platen to close the mold, and core section c mounted on the sub-platen enters the mold and forces the molding powder into all parts of the mold.

The mold is held closed a sufficient time to complete the molding operation and at the expiration of that interval the timer energizes the solenoid 20 which reverses the position of the valve-operating lever 14 to admit fluid to the lower end of the ram cylinder to move the ram 2 upwardly. When the ram 2 has moved upwardly a fraction of an inch the timer energizes the solenoid 19 and operates lever 15 which controls a valve to admit fluid pressure to the cylinder of ram 1 to retract said ram to open the mold. The very slight upward movement of ram 2 before the mold is opened strips the core piece from the molded article but does not remove the core piece from the molded article. While the core piece is still within the molded article ram 1 moves to open the mold, and, the molded article being held by the core piece, this opening movement of the mold section a strips the molded article from that mold section. This movement of ram 1 and platen 1a takes place before the bar 41 carried by the platen 1a contacts the screws 44 mounted on the sub-platen 2b. When the bar 41 contacts screws 44 the further retracting movement of the platen 1a pulls the sub-platen 2b to the rear in article-stripping direction, that is toward the right as viewed in Fig. 1, thereby causing the core section c to strip the molded article from the mold section b attached to the fixed platen 1b. The molded article may then drop from the core piece c through an opening in the press bed 10 and into a suitable container (not shown). The timer then energizes solenoid 18 which reverses the position of lever 15 to admit fluid pressure to the cylinder of ram 1 to move said ram and platen 1a carried thereby to again close the mold. The mold-closing movement of platen 1a causes bar 41 to move sub-platen 2b back to its central position with its forward edge in engagement with the stop screws 47 and the core piece c centered directly over the mold. This return movement of the sub-platen 2b may be brought about during the upward movement of the platen 2a to its fully retracted position due to the fact that the bar 41 extends upwardly through the opening 42 in the rear end of the sub-platen 2b.

Fig. 6 diagrammatically illustrates the positions of the contact cams with respect to their contact points 20$^b$, 21$^b$, 19$^b$, 18$^b$ and 39$^b$, with the press mechanism in the position illustrated in Fig. 1. The contact cams rotate counter-clockwise as illustrated in this figure. Contact cam 20$^a$ has engaged and passed its contact 20$^b$ thereby energizing solenoid 20, and the ram 2 has moved close to the limit of its upward travel. Contact cam 19$^a$ has engaged and passed its contact 19$^b$. Solenoid 19 was energized to bring about the withdrawal of ram 1. The engagement of cam 19$^a$ with its contact follows closely upon the engagement of cam 20$^a$ with its contact. Contact cam 18$^a$ has engaged and passed its contact 18$^b$. Solenoid 18 was energized and ram 1 moved inwardly to the limit of its movement. Contact cam 39$^a$ has just engaged and passed its contact 39$^b$. Solenoid 39 was energized and the feeder slide 31 withdrawn. Contact cam 21$^a$ is shown as approaching its contact 21$^b$ to energize solenoid 21 to thereby reverse the movement of ram 2 to close the mold. The mold then remains closed until contact cam 20$^a$ again engages its contact 20$^b$ and again energizes solenoid 20 to bring about the upward movement of ram 2. The curing time is determined by the time elapsing between the engagement of contact cam 21$^a$ with its contact 21$^b$ and the engagement of contact cam 20$^a$ with its contact 20$^b$.

The operating cycle is determined by the character of the piece to be molded, and may be varied with respect to the intervals between the various phases thereof, by means provided in the electric timer. The press may be manually operated when desirable, and the sequence of operation is identical with that controlled automatically.

Compressed air being necessary to clean the molds between each operating cycle, makes it desirable and economical to use pneumatic control means for the various phases of press operation. They are quick in action, less costly to manufacture, and not subject to frequent repairs. Standard solenoid hydraulic valves can be used to replace the pneumatically controlled hydraulic valves if desired, and a hydraulic ram may be substituted for the pneumatically controlled feeder slide movement.

The jacketed hopper 30 is so constructed that any suitable fluid means may be used for heating the hopper in instances where preheating of the molding powder is found necessary.

What is claimed as the invention and desired to be secured by Letters Patent, is:

1. In a press having hydraulic means angularly disposed therein, the combination of a vertically movable horizontal platen, a reciprocable horizontally movable sub-platen mounted on said horizontal platen and provided with an opening in one end thereof, adjustable means carried by the sub-platen and entering said opening for the purpose of restricting the opening to a predetermined size, and a movable vertical platen having a rigid vertical member mounted thereon and extending through the opening in the sub-platen and engaging the said adjustable means to move the sub-platen in a horizontal plane.

2. A molding press comprising two vertically disposed platens carrying separable cooperating mold-forming members, power-operated means for moving one of said platens horizontally away from the other platen to separate the mold-forming members, a vertically movable horizontally disposed platen above the vertically disposed platens, power-operated means for reciprocating said vertically movable platen, a horizontally reciprocable sub-platen mounted on the said horizontally disposed platen, a core piece depending from the said sub-platen and adapted to enter the mold when the horizontal platen is moved downwardly to close the mold, and lost-motion means connected to the horizontally movable vertical platen and to the sub-platen to cause a delayed horizontal movement of the sub-platen during the mold-opening movement of the vertical platen.

3. In a press, the combination of a fixed vertical platen, a horizontally movable vertical platen cooperating with said fixed platen, a vertically movable horizontal platen, a horizontally movable reciprocable sub-platen mounted on the horizontal platen, adjustable means mounted on the horizontal platen to limit the movement of the sub-platen, said sub-platen being provided with an opening in one end, adjustable means carried by the sub-platen and extending into said opening, a vertical member rigidly mounted on the movable vertical platen and extending through the opening in the sub-platen to engage the said adjustable means and move the sub-platen horizontally with said movable vertical platen, said adjustable means determining the extent of horizontal movement of the sub-platen with the movable vertical platen.

4. In a press comprising hydraulic means angularly disposed therein, the combination of a fixed vertical platen, a movable vertical platen and hydraulic ram operating it, a vertically movable horizontal platen and hydraulic ram operating it, a reciprocable sub-platen mounted on said horizontal platen, and adjustable lost-motion means between the movable vertical platen and the sub-platen and connected to and operated by the movable vertical platen, said lost-motion means determining the extent of the lateral movement of the sub-platen during the receding stroke of the hydraulic ram controlling the movable vertical platen.

5. In a press comprising hydraulic means angularly disposed therein, the combination of a vertically movable horizontal platen and a hydraulic ram operating it, a reciprocable sub-platen carried by said horizontal platen and movable in a horizontal plane, adjustable means mounted on the horizontal platen to limit the movement of the sub-platen to mold-forming position, said sub-platen being provided with an opening in one end, adjustable means extending into said opening, a fixed vertical platen, a movable vertical platen cooperating with said fixed platen to form a mold, a hydraulic ram operating said movable vertical platen, means on said movable vertical platen extending through the opening in the sub-platen to move the sub-platen in a horizontal plane, a hopper, means supporting said hopper, a feeder slide mounted under said hopper, pneumatic means for reciprocating the feeder slide, manual means for controlling the operation of said pneumatic means, and manual means for controlling the operation of the hydraulic rams connected to and operating the movable platens.

6. In a press comprising hydraulic means angularly disposed therein, the combination of a fixed vertical platen, a movable vertical platen and a hydraulic ram operating it, a vertically movable horizontal platen and a hydraulic ram operating it, a reciprocable sub-platen mounted on said horizontal platen, intermediate adjustable lost-motion means between the movable vertical platen and the sub-platen and connected to and operated by the movable vertical platen to cause a movement of the sub-platen during a part only of the receding strokes of the two hydraulic rams controlling the two movable platens, a hopper with means for supporting it, a reciprocating feeder slide under the hopper, pneumatic means for operating the feeder slide, control means for the hydraulic rams, pneumatic means for operating the said control means, solenoid means to operate the pneumatic means controlling the feeder slide, solenoid means to operate the pneumatic means connected to the said control means, and an automatic electric time control to energize the said solenoid means in a predetermined cycle of operations.

7. A molding press comprising two platens carrying separable cooperating mold-forming members, power-operated means for moving one of said platens away from the other platen to separate the mold-forming members, a platen adapted to be moved at an angle to the platens carrying the mold-forming members to close one end of the mold, power-operated means for reciprocating said mold-closing platen, and lost-motion means connected to and operated by the movable platen carrying one of the mold members and connected to the mold-closing platen to cause a relative lateral movement between the mold-closing platen and the other platen carrying the other mold-forming member during a portion only of the mold-opening movement of the said movable platen carrying one of the mold-forming members.

8. A molding press comprising two vertically disposed platens carrying separable cooperating mold-forming members, power-operated means for moving one of said platens horizontally away from the other platen to separate the mold-forming members, a vertically movable horizontally disposed mold-closing platen above the vertically disposed platens, power-operated means for reciprocating said vertically movable platen, a horizontally reciprocable sub-platen mounted on the said horizontally disposed platen and vertically movable with it, a core-piece depending from the sub-platen and adapted to enter the mold when the horizontal platen is moved downwardly to close the mold, and means connected to the horizontally movable vertical platen and to the sub-platen and operable by the movable vertical platen during the vertical movement of the sub-platen to horizontally move the sub-platen during a part only of the mold-opening movement of the said vertical platen.

9. A molding press comprising two platens carrying separable cooperating mold-forming members, power-operated means for moving one of said platens away from the other platen to separate the mold-forming members, a mold-closing platen movable at an angle to the platens carrying the mold-forming members to close one end of the mold, power-operated means for reciprocating said mold-closing platen to close and open one end of the mold, a core piece carried by the mold-closing platen and adapted to enter the mold and complete the molding operation when the said platen is moved to close the end of the mold, means supporting the mold-closing platen for lateral movement transversely of the direction of its mold-opening movement, and means operating in timed relation to the mold-opening movement of the movable platen carrying one of the mold members and during a part only of said movement and operatively connected to the core piece and effecting a relative lateral movement between the core piece and the other platen carrying the other mold-forming member to detach the molded article from said other mold-forming member.

10. A molding press comprising two platens carrying separable cooperating mold-forming members, power-operated means for moving one of said platens away from the other platen to separate the mold-forming members, a platen movable at an angle to the platens carrying the mold-forming members to close one end of the mold, means supporting the mold-closing platen for lateral movement transversely of the direction of its mold-opening movement, power-operated means for reciprocating said mold-closing platen to close and open one end of the mold, a core piece carried by the mold-closing platen and adapted to enter the mold and complete the molding operation when the said platen is moved to close the end of the mold, and means connected to and operated by the movable platen carrying one of the mold members and connected to the mold closing platen and effecting a relative lateral movement between the core piece and the other platen carrying the other mold-forming member during a part only of the mold-opening movement of the movable platen carrying one of the mold-forming members.

11. A molding press comprising a plurality of platens carrying separable cooperating mold-forming members, power-operated means for moving at least one of said platens to separate the mold-forming members, a mold-closing platen movable at an angle to the platens carrying the mold-forming members to close one end of the mold, power-operated means for reciprocating said mold-closing platen, a stripping projection carried by the mold-closing platen and adapted to be embedded in the molded article when the said platen is moved to close the end of the mold, and lost-motion means connected to and operated by a movable platen carrying one of the mold members and connected to the platen carrying the stripping projection in all positions of the said latter platen, to force a relative lateral stripping movement between the stripping projection and the platens carrying the mold-forming members to detach the molded article from the mold-forming members.

12. A molding press comprising two platens carrying separable cooperating mold-forming members, a power-operated means for moving one of said platens away from the other platen to separate the mold-forming members, a mold-closing and article-stripping platen, means supporting said article-stripping platen for movement at an angle to the platens carrying the mold-forming members to close one end of the mold, means supporting the mold-closing platen for lateral movement transversely of the direction of its mold-opening movement, power-operated means for reciprocating said mold-closing platen to close and open one end of the mold, and means connected to the movable platen carrying one of the mold members and connected to the article-stripping platen and operated by the mold-opening movement of said movable platen and during a part only of said movement to force a relative lateral movement in article-stripping direction between the stripping platen and the said other platen carrying the other mold-forming member, and means carried by the stripping platen to detach the molded article from the said other mold-forming member.

13. A molding press comprising two platens carrying separable cooperating mold-forming members, a power-operated means for moving one of said platens away from the other platen to separate the mold-forming members, a mold-closing and article-stripping platen, means supporting said article-stripping platen for movement at an angle to the platens carrying the mold-forming members to close and open one end of the mold, means supporting said article-stripping platen for lateral stripping movement transversely of the direction of its mold-opening movement, means for forming a connection between the molded article and the article-stripping platen when the mold is closed, power-operated means for reciprocating said mold-closing and article-stripping platen to close and open one end of the mold, and means operating in timed relation to the mold-opening movement of the movable platen carrying one of the mold members and connected to the article-stripping platen and operating during a part only of said mold-opening movement to force a relative lateral stripping movement in article-stripping direction between the stripping platen and the said other platen carrying the other mold-forming member to detach the molded article from said other mold-forming member.

14. A molding press comprising two platens carrying separable cooperating mold-forming members, power-operated means for moving one of said platens away from the other platen to separate the mold-forming members, a mold-closing and article-stripping platen, means supporting said article-stripping and mold-closing platen for movement at an angle to the platens carrying the mold-forming members to close and open one end of the mold, means supporting said article-stripping platen for lateral stripping movement transversely of the direction of its mold-opening movement, power-operated means for reciprocating said mold-closing and article-stripping platen to close and open one end of the mold, and means operating in timed relation to the mold-opening movement of the movable platen carrying one of the mold-forming members and during a part only of said mold-opening movement and connected to the article-stripping platen to move the stripping platen transversely of the direction of its mold-opening movement and during a part only of the mold-separating movement of the platen carrying one of the mold-forming members.

15. A molding press comprising two platens, carrying separable cooperating mold-forming members, power-operated means for moving one of said platens away from the other platen to separate the mold-forming members, a mold-closing and article-stripping platen, means supporting said article-stripping and mold-closing platen for movement at an angle to the platens carrying the mold-forming members to close one end of the mold, power-operated means for reciprocating said mold-closing platen, and lost-motion means connected to and operated by the mold-opening movement of the movable platen carrying one of the mold-members and connected to the article-stripping platen to move the stripping platen in stripping direction during the mold-opening operation of the mold-carrying platen.

16. A molding press comprising two vertically disposed platens carrying separable cooperating mold-forming members, one of said platens being movable horizontally away from the other platen to separate the mold-forming members, a vertically movable horizontally disposed platen above the vertically disposed platens, a horizontally reciprocable sub-platen mounted on the said horizontally disposed platen, a core piece depending from the sub-platen to enter the mold when the horizontal platen is moved downward to close the mold, power-operated means for moving upwardly said horizontally disposed platen and the core piece, means for moving horizontally in mold-opening direction one of the platens carrying a mold-forming member after the horizontal platen has started its upward movement and while the said core piece is within the mold, and means operating in timed relation to the mold-opening movement of the horizontally movable vertical platen and connected to the sub-platen and operable during a part only of the mold-opening movement of said vertical platen to move the sub-platen horizontally in article-stripping direction during the mold-opening movement of the vertical platen and while the core piece is in the mold.

17. A molding press comprising two platens carrying separable cooperating mold-forming members, one of said platens being movable away from the other platen to separate the mold-forming members, a mold-closing and article-stripping platen, means supporting said article-stripping and mold-closing platens for movement at an angle to the platen carrying the mold-forming members to close and open one end of the mold, means supporting said article-stripping platen for lateral stripping movement transversely of the direction of its mold-opening movement, means for forming a connection between the molded article and article-stripping platen when the mold is closed, power-operated means for reciprocating said mold-closing platen to close and open one end of the mold, power-operated means for moving in mold-opening direction one of the platens carrying a mold-forming member after the mold-closing and article-stripping platen has started its movement in mold-opening direction and while the connection between the molded article and the article-stripping platen is maintained, and means operating in timed relation to the mold-opening movement of a movable mold-forming member and during a part only of said mold-opening movement and operable to move the stripping platen in stripping direction during a part only of the mold-opening movement of the said movable mold-forming member and while the connection between the article and the stripping platen is maintained.

18. A molding press comprising two platens carrying separable cooperating mold-forming members, one of said platens being movable away from the other platen to separate the mold-forming members, a mold-closing and article-stripping platen, means supporting said article-stripping and mold-closing platen for movement at an angle to the platens carrying the mold-forming members to close and open one end of the mold, means supporting said article-stripping platen for lateral stripping movement transversely of the direction of its mold-opening movement, hydraulic means for reciprocating said mold-closing platen to close and open one end of the mold, means for forming a connnection between the molded article and the article-stripping platen when the mold is closed, hydraulic means for moving in mold-opening direction one of the platens carrying a mold-forming member after the mold-closing and article-stripping platen has started its movement in mold-opening direction and while the connection between the molded article and the article-stripping platen is maintained, a bar carried by the platen carrying the movable mold-forming member and connected to the stripping platen and operative in timed relation to the mold-opening movement of said movable platen to move the stripping platen transversely of its mold-opening movement during a part only of the mold-opening movement of the said movable mold-forming member and while the connection between the article and the stripping platen is maintained, and an automatic electric time control means to time the operations of the movable platens in said predetermined cycle.

19. A molding press comprising a plurality of platens carrying separable cooperating mold-forming members, power-operated means for relatively moving said platens to separate the mold-forming members, a mold-closing platen movable at an angle to the platens carrying the mold-forming members to close one end of the mold, power-operated means for reciprocating said mold-closing platen to close and open one end of the mold, a stripping projection carried by the mold-closing platen and adapted to enter the mold and to be embedded in the molded article when the said platen is moved to close the end of the mold, and means for moving in mold-opening direction one of the platens carrying a mold-forming member during a part only of the mold-opening movement of the mold-closing platen and after the mold-closing platen has started its mold-opening movement and while the stripping projection is within the mold and in engagement with the molded article.

JOHN LAUTERBACH.